US009816598B2

(12) United States Patent
Wong (10) Patent No.: US 9,816,598 B2
(45) Date of Patent: Nov. 14, 2017

(54) KEY PULLEY SEGMENT FEATURES, SEGMENT STACK CONFIGURATION, AND CAM AND ROLLER DESIGN AND ACTUATION IN A SYNCHRONIZED SEGMENTALLY INTERCHANGING PULLEY TRANSMISSION SYSTEM

(71) Applicant: 1783590 Ontario Ltd., Toronto (CA)

(72) Inventor: Anthony Wong, Scarborough (CA)

(73) Assignee: Inmotive Inc. (CA)

( * ) Notice: Subject to any disclaimer, the term of this patent is extended or adjusted under 35 U.S.C. 154(b) by 0 days.

(21) Appl. No.: 14/835,353

(22) Filed: Aug. 25, 2015

(65) Prior Publication Data

US 2016/0169363 A1 Jun. 16, 2016

Related U.S. Application Data

(63) Continuation of application No. 14/114,414, filed as application No. PCT/CA2012/000381 on Apr. 26, 2012, now abandoned.

(Continued)

(51) Int. Cl.
*F16H 9/02* (2006.01)
*F16H 59/00* (2006.01)
(Continued)

(52) U.S. Cl.
CPC .............. *F16H 55/56* (2013.01); *F16H 9/06* (2013.01); *F16H 9/24* (2013.01)

(58) Field of Classification Search
CPC ... F16H 55/54; F16H 9/10; F16H 9/24; F16H 55/30; B62M 9/08
(Continued)

(56) References Cited

U.S. PATENT DOCUMENTS 1,044,535 A * 11/1912 Kent et al. .............. F16H 55/54
474/47
1,493,863 A * 5/1924 Miller .................... B65G 23/00
474/163
(Continued)

FOREIGN PATENT DOCUMENTS

DE 3626452 A1 2/1988
RU 50269 U1 12/2005
(Continued)

OTHER PUBLICATIONS

International Search Report corresponding to Int'l Patent Application No. PCT/CA2012/000381, dated Sep. 18, 2012, 4 pages.
(Continued)

*Primary Examiner* — Henry Liu
(74) *Attorney, Agent, or Firm* — Tarolli, Sundheim, Covell & Tummino LLP (57) ABSTRACT

A key pulley segment in a synchronized, segmentally interchanging pulley transmission system is either first or last in a pulley segment set to engage an endless member. The first or last key segment teeth to engage or disengage, respectively, are shortened or completely trimmed, and the adjacent pulley segment to the key segment is elongated such that the inward portion of the tooth profile extends toward the key segment. Shortened tooth or teeth and an elongated adjacent segment together allow for many pulley segments to be designed as key segments. Completely trimmed teeth may be engineered to create a supporting surface for the endless member on the key segment. The elongated adjacent segment may have an extending portion which slidably mates with the supporting surface of the key segment, thereby receiving radial support therefrom. Multiple pulley segments from different pulley segment sets may be con-
(Continued)

nected or constructed to move together in a unified stack, and may be staggered such that any one segment may be in an engaging position with the endless member when the unified stack is moved along the axis of rotation. Unified stacks may have guiding rails on both inner and outer radial surfaces, and the pulley assembly may have mating features that receive such guiding rails. Any number of the pulley segments in a unified stack may be key pulley segments. Pulley segments of a stack may be vertically separated into one or more unified stacks. Unified stacks may be moved by way of a cam or roller cam system, where each unified stack has a slidably or ratably attached roller and roller-arm. Chassis-mounted cams engage the rollers outside of the contact zone, rollers and roller-arms are moved into and out of engagement with the cams, and individual segments of a unified stack are moved into or out of engagement. Rollers may be actuated into and out of engagement by electromagnets, fixable mounted in an array. Rollers may discretely engage with multiple cams, by way of several electromagnet-arrays, and thereby complete several stack axial motions. Electromagnets in an array may be selectively energized to move selected rollers to an active position in order to effect key pulley segment engagement, stack axial movement and transition.

7 Claims, 12 Drawing Sheets

Related U.S. Application Data (60) Provisional application No. 61/479,032, filed on Apr. 26, 2011.

(51) Int. Cl.
    *F16H 61/00*     (2006.01)
    *F16H 63/00*     (2006.01)
    *F16H 55/56*     (2006.01)
    *F16H 9/24*     (2006.01)
    *F16H 9/06*     (2006.01)

(58) Field of Classification Search
    USPC .......................................................... 474/49
    See application file for complete search history.

(56) References Cited

U.S. PATENT DOCUMENTS

| | | | | |
|---|---|---|---|---|
| 1,662,037 A * | 3/1928 | Wichtendahl | ............. | F16H 9/24 474/53 |
| 1,714,221 A * | 5/1929 | Hibbard | ............. | F16H 7/04 474/148 |
| 2,827,795 A * | 3/1958 | Caballeros | ............. | F16H 9/24 474/134 |
| 3,938,403 A * | 2/1976 | Donaldson | ............. | F16H 9/10 280/236 |
| 3,956,943 A * | 5/1976 | Yamasaki | ............. | F16H 55/30 474/148 |
| 4,129,044 A * | 12/1978 | Erickson | ............. | B62M 9/08 280/236 |
| 4,457,739 A * | 7/1984 | Iseman | ............. | B62M 9/08 474/49 |
| 4,493,678 A * | 1/1985 | Husted | ............. | B62M 9/08 474/164 |
| 4,498,351 A * | 2/1985 | Ahoor | ............. | F16H 9/10 474/47 |
| 4,571,218 A * | 2/1986 | Reeves, Jr. | ............. | F16H 55/30 474/162 |
| 4,634,406 A * | 1/1987 | Hufschmid | ............. | B62M 9/08 474/49 |
| 4,642,070 A * | 2/1987 | Walker | ............. | B62M 9/08 474/49 |
| 4,645,475 A * | 2/1987 | Husted | ............. | B62M 9/08 474/164 |
| 4,696,662 A * | 9/1987 | Gummeringer | ............. | F16H 55/54 474/49 |
| 4,740,190 A * | 4/1988 | Pike | ............. | B62M 9/08 474/49 |
| 4,772,250 A * | 9/1988 | Kovar | ............. | B62M 9/08 474/47 |
| 4,850,939 A * | 7/1989 | Chilcote | ............. | B62M 9/08 474/163 |
| 4,878,883 A * | 11/1989 | Wheless | ............. | F16H 55/54 474/51 |
| 5,041,061 A * | 8/1991 | Leonard | ............. | F16H 55/54 474/52 |
| 5,443,423 A * | 8/1995 | Ha | ............. | F16H 55/52 474/47 |
| 5,492,506 A * | 2/1996 | Lorance | ............. | F16H 55/54 474/49 |
| 5,637,046 A * | 6/1997 | Ha | ............. | F16H 9/10 474/53 |
| 5,984,814 A * | 11/1999 | Davenport | ............. | B62M 9/08 474/50 |
| 6,267,699 B1 * | 7/2001 | Gruich | ............. | F16H 55/52 474/116 |
| 6,332,852 B1 * | 12/2001 | Allard | ............. | B62M 9/08 474/49 |
| 6,432,009 B1 * | 8/2002 | Hansen | ............. | B62M 9/08 474/148 |
| 6,749,531 B2 * | 6/2004 | Kang | ............. | B62M 9/08 474/160 |
| 7,713,153 B2 * | 5/2010 | Naude | ............. | F16H 9/24 474/47 |
| 8,257,209 B1 * | 9/2012 | Lane | ............. | F16H 9/10 474/53 |
| 8,753,236 B2 * | 6/2014 | Wong | ............. | F16H 9/24 474/47 |
| 2004/0198542 A1 * | 10/2004 | Fuerle | ............. | F16H 9/24 474/162 |
| 2009/0118043 A1 * | 5/2009 | Eitan | ............. | F16H 55/54 474/56 |
| 2011/0045928 A1 * | 2/2011 | Wong | ............. | F16H 9/24 474/47 |

FOREIGN PATENT DOCUMENTS

| | | |
|---|---|---|
| SU | 303466 A1 | 5/1971 |
| WO | 199823481 A1 | 6/1998 |
| WO | 2005111463 A1 | 11/2005 |
| WO | 2011045928 A1 | 4/2011 |

OTHER PUBLICATIONS

China Office Action for Application No. 201280031856.4, dated Sep. 28, 2015, 9 pages.
China Office Action for Application No. 201280031856.4, dated Oct. 31, 2016, 8 pages.
Office Action for corresponding Russian Application No. 20131562644/11(082106), dated May 5, 2016, 2 pages.
Examination Report for corresponding Australian Application No. 2012248069.
Notice of Acceptance for corresponding Australian Application No. 2012248069.
Rejection Notice for corresponding Japanese Patent Application No. 2014-506696.
Decision to Grant for corresponding Japanese Patent Appl. No. 2014-506696.
Decision to Grant for corresponding Russian Patent Appl. No. 20131562644/11(082106).

\* cited by examiner

KEY PULLEY SEGMENT FEATURES, SEGMENT STACK CONFIGURATION, AND CAM AND ROLLER DESIGN AND ACTUATION IN A SYNCHRONIZED SEGMENTALLY INTERCHANGING PULLEY TRANSMISSION SYSTEM

CROSS-REFERENCE TO RELATED APPLICATIONS

This application is a Continuation of U.S. application Ser. No. 14/114,414 filed Jan. 13, 2014, entitled KEY PULLEY SEGMENT FEATURES, SEGMENT STACK CONFIGURATION, AND CAM AND ROLLER DESIGN AND ACTUATION IN A SYNCHRONIZED SEGMENTALLY INTERCHANGING PULLEY TRANSMISSION SYSTEM, which is a national phase of Application No. PCT/CA2012/000381 flied Apr. 26, 2012. entitled KEY PULLEY SEGMENT FEATURES, SEGMENT STACK CONFIGURATION, AND CAM AND ROLLER DESIGN AND ACTUATION IN A SYNCHRONIZED SEGMENTALLY INTERCHANGING PULLEY TRANSMISSION SYSTEM, which claims the benefit of U.S. Provisional Patent Application No, 61/479,032 filed on Apr. 26, 2011 and entitled SYNCHRONIZED SEGMENTALLY INTERNCHANGING PULLEY TRANSMISSION SYSEM, the entire contents of all of which are incorporated herein by reference, This application is related to International PCT Application Publication No. WO2005/111463 filed on May. 19, 2005 and entitled SYNCHRONIZED SEGMENTALLY INTERCHANGING PULLEY TRANSMISSION SYSTEM.

FIELD OF THE INVENTION

The present invention relates to transmission systems, and more particularly to mechatronic variable speed drives.

BACKGROUND OF THE INVENTION

A synchronized, segmentally interchanging pulley transmission system ("SSIPTS") is the subject of International PCT Application Publication No. WO 2005/111463, with a priority date of May 19, 2005, the entire content of which is incorporated herein by reference.

The development of the SSIPTS has revealed several novel additional features which may enhance the operation of such a mechatronic variable speed drive system.

Accordingly, there is a need for novel improvements and additional features for use in the SSIPTS.

SUMMARY OF THE INVENTION

In one aspect, there is provided a key pulley segment, acting as one pulley segment in a pulley segment set, in a synchronized segmentally interchanging pulley transmission system, and having a distal relationship with the teeth of a second pulley such that simultaneous engagement of an endless member is possible, incorporating one or more shortened or completely trimmed key pulley segment teeth, which teeth are either first or last in the pulley segment set to engage the endless member.

In accordance with another aspect, there is provided a key pulley segment, acting as one pulley segment in a pulley segment set, in a synchronized segmentally interchanging pulley transmission system, and having a distal relationship with the teeth of a second pulley such that simultaneous engagement of an endless member is possible, incorporating an adjacent pulley segment with elongated or overhanging teeth features, with an extending segment portion which may or may not slidably mate with a supporting surface of the key pulley segment.

In accordance with another aspect, there is provided a supporting surface on a key pulley segment for an endless member, created by the shortening or complete trimming of one or more key pulley segment teeth, in a synchronized segmentally interchanging pulley transmission system.

In accordance with another aspect, there is provided a unified stack comprised of multiple, staggered pulley segments, vertically connected or constructed onto one or more slidably movable components, with mating features and guiding rails on their inner and outer surfaces, any of which pulley segments in the unified stack may engage an endless member, in a synchronized segmentally interchanging pulley transmission system.

In accordance with another aspect, there is provided a core pulley in a synchronized segmentally interchanging pulley transmission system, with guiding rails which mate with the mating features on a inner surface of a most proximate unified stack comprised of multiple, staggered pulley segments, vertically connected or constructed onto one or more slidably movable components, where the guiding rails of said core pulley may also function as teeth capable of engaging the endless member.

In accordance with another aspect, there is provided a series of one or more cams, in a synchronized segmentally interchanging pulley transmission system, affixed or fixably mounted to a chassis or housing, and a series of rollers, fixed members or other such cam followers, with a roller arm affixed to each roller, where the roller and roller arm are slidably or rotably mounted to unified pulley segment stacks, together capable of moving a unified pulley segment stack by the movement of each roller into and out of an active position, enabling its engagement with a cam, in a manner such that individual pulley segments of said stack may be moved into or out of an engaging position.

In accordance with another aspect, there is provided the actuation of a roller, or fixed member or other such cam follower, and its roller-arm, together into its active position, before the point of engagement of the roller with a cam, and out of its active position, after its point of engagement with the cam, by an array of fixably mounted electromagnets located near the path of a roller, in proximity to or as part of the cam in a synchronized segmentally interchanging pulley transmission system.

In accordance with another aspect, there is provided an arrangement of multiple cams, in a synchronized segmentally interchanging pulley transmission system, such that discrete sequential engagement by a series of rollers, or fixed members or other such cam followers, together with the corresponding series of attached unified pulley segment stacks, is available, such that a unified pulley segment stack may move into a plurality of positions, which positions correspond to the several engaging positions of pulley segments contained in the stack.

In accordance with another aspect, there is provided an array of fixably mounted electromagnets, arranged such that a feature on a pulley segment or pulley segment stack in a synchronized segmentally interchanging pulley transmission system may be discretely actuated, by the synchronization of the energizing of one or more selectable electromagnets to the position and motion of the desired pulley segment feature, which feature may be the pulley segment or pulley segment stack itself, a roller, a cam follower or other fixed member, or some other actuator feature, when the desired feature passes proximate to the selected electromagnet or electromagnets in the array.

In accordance with another aspect, there is provided a system of sequencing the energization of fixably mounted electromagnets in an array, such that pulley segment features, which features may be a pulley segment or pulley segment stack itself, a roller, a cam follower or other fixed member, or some other actuator feature, such that an individual pulley segment or pulley segment stack may be discretely actuated, in a synchronized segmentally interchanging pulley transmission system.

These and other features, advantages and objects will be further understood and appreciated by those skilled in the art by reference to the following specification, claims and appended drawings.

BRIEF DESCRIPTION OF THE DRAWINGS

Embodiments will now be described by way of example only with reference to the accompanying drawings.

DETAILED DESCRIPTION OF THE EMBODIMENTS

The present invention operates as parts of, or in conjunction with, a SSIPTS, a mechatronic variable speed drive that changes ratio under load, and involves a plurality of pulleys, divided into segments, which segments move in channels or on rails along the rotational axis, into and out of the path of a toothed belt or chain (an "endless member"). This paragraph, and several of those following, briefly describe the functioning of a SSIPTS, in the context of which the present invention operates.

In a SSIPTS, as segments of a plurality of toothed, concentric and coaxial pulleys move axially, along channels or rails, into and out of the path of an endless member, from either side thereof, pulley segment movement is coordinated by a synchronization and timing system, and the coordinated movement of pulley segments allows the endless member to change engagement between a plurality of concentric pulleys, without disrupting their rotation or the delivery of power. This is accomplished by enabling the teeth of the endless member to be continuously engaged by at least one toothed pulley, and at some points—when the endless member is changing engagement between pulleys—engaged by both the engaging and disengaging pulleys, in transition.

The continuous engagement is made possible by the designation of certain pulley segments as "key pulley segments", the initial pulley segments involved in the transition from a smaller pulley segment set and the last pulley segments involved in the transition to a smaller pulley segment set. Key pulley segments are defined by their angular relationship with one or more smaller pulley segment sets, such that the circumferential position of the key pulley segment allows it to engage the endless member while the endless member is still engaging the smaller pulley segment set, without introducing significant interference or slack.

In the SSIPTS, each pulley segment is individually moved by the system actuator, in an axial direction from its non-engaging position to its engaging position and from its engaging position to its non-engaging position, as controlled by the system sequencer, which ensures that the appropriate pulley segments move from their engaging position to their non-engaging position, or from their non-engaging position to their engaging position, in the order and timing that is optimal to keep the endless member engaged with pulley segments of more than one set during its transition from a disengaging pulley segment set (an "origin set") to an engaging pulley segment set (a "destination set").

Once a key pulley segment moves into its engaging position, each following pulley segment in the same pulley segment set is subsequently moved into its engaging position as it passes outside of the "contact zone" (the angular area of contact between the endless member and the origin set). Thus, the following pulley segments continue the engagement of the endless member with the destination set. The actuator moves each individual pulley segment at a speed sufficient for it to complete its movement between its engaging position and its non-engaging position, in either direction, during the period of time while they are outside the contact zone.

Enhanced Features of the Key Pulley Segment

One method of engineering a pulley segment to be a key pulley segment is to rotate the entire pulley segment set (ring of pulley segments which together act as a pulley) around the axis of rotation, until they are circumferentially aligned in relation to a second pulley (or pulley segment set) such that the key pulley segment will have a distal relationship with the teeth of said second pulley such that the endless member may be engaged with the teeth of the key pulley segment and the teeth of second pulley simultaneously. Said distal relationship largely concerns the pitch of the teeth of the endless member, and the position of the teeth of said second pulley which are approximately tangential to the teeth of said key pulley segment.

Another method of engineering a pulley segment to be a key pulley segment is to shorten the tooth that is either first in the pulley segment set to engage the endless member, or the last in the pulley segment set to engage the endless member. This will allow a pulley segment in a pulley segment set to be a key pulley segment without rotating the entire pulley segment set in relation to another pulley or pulley segment set, which will enable multiple pulley segments in one pulley segment set to be key pulley segments.

Figure 1:
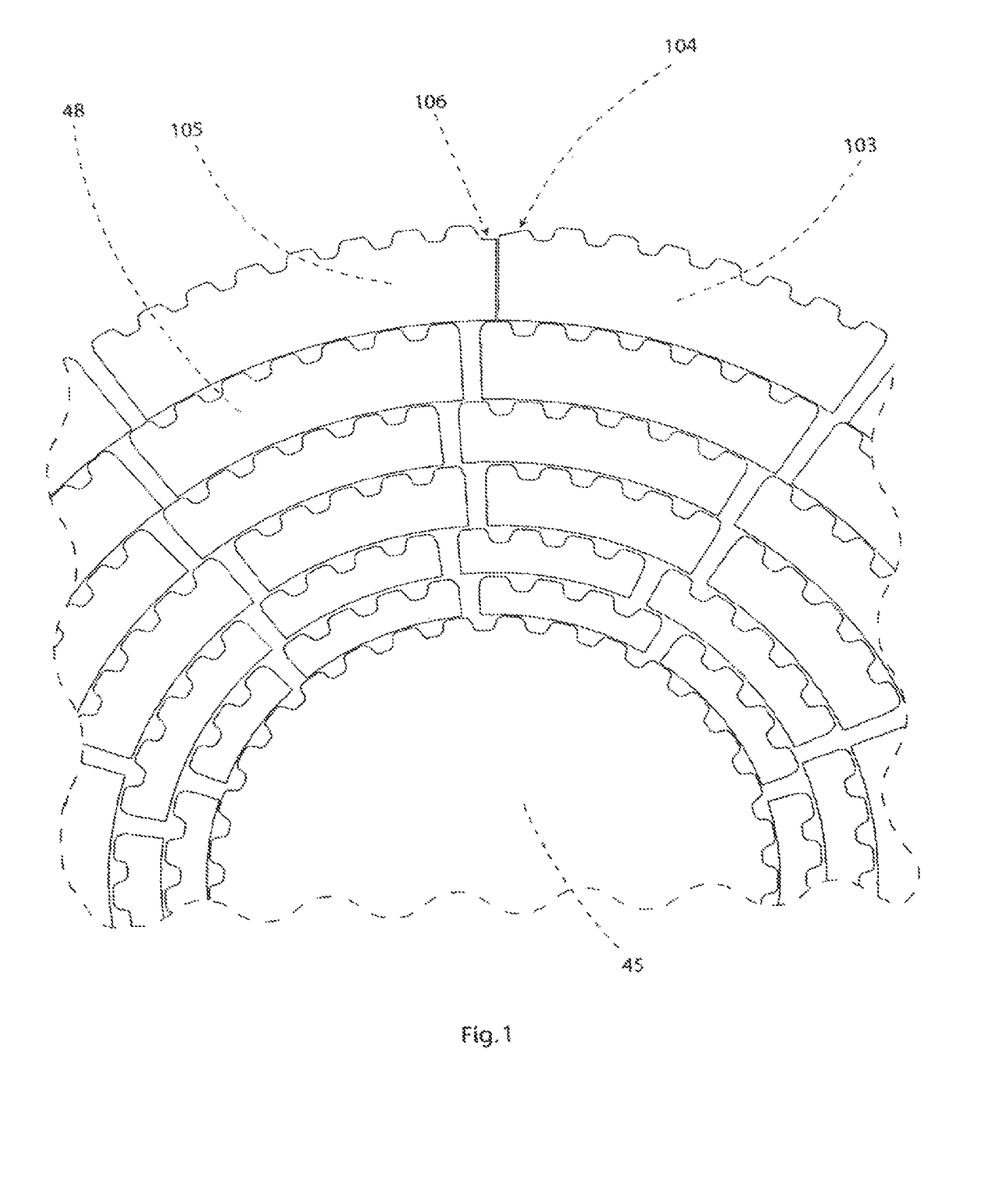
FIG. 1 shows a side sectional view of a SSIPTS core pulley and pulley segment sets, including a key pulley segment and adjacent pulley segment.

Referring to FIG. 1, the shortened tooth 104 on a key pulley segment 103 may be seen. One potential issue when designing a shortened tooth 104 on a key pulley segment 103 is that it may affect the roundness of the pulley segment set when acting as a pulley. To mitigate the change in shape, the adjacent pulley segment 105 to a key pulley segment 103 may be elongated in such a way that the inward portion of the tooth profile (the "valley" located between the segment teeth) will extend toward key pulley segment 103. Elongated as such, the adjacent pulley segment 105 extends toward said key pulley segment 103, creating a valley 106 between the shortened tooth 104 of the key pulley segment 103 and the adjacent pulley segment 105 which will support the tooth of the endless member that protrudes toward the space between said key pulley segment and said adjacent pulley segment, when both said key pulley segment and said adjacent pulley segment are in the position in which they may engage the endless member. This extension of said adjacent pulley segment will ensure that the pulley segment set will be round, such that the endless member will cooperate with all pulley segments smoothly, preventing vibration and inefficiency.

The combination of these two design features, both the shortened tooth 104 on the key pulley segment 103, and the elongation of the adjacent pulley segment 105 to create a valley 106 with the shortened tooth 104 of the key pulley segment 103, allows for many pulley segments 48 to be designed as key pulley segments, such that the endless member may be transitioned from either a larger pulley segment set to a smaller pulley or pulley segment set, or from a smaller pulley or pulley segment set to a larger pulley segment set, without unwanted interference between any operating features, and without undesired slack in the endless member. The transmission of power from pulley segment sets via the endless member to a cooperating pulley or a cooperating second pulley segment set (a second instance of the SSIPTS) may occur at high speed because the roundness of the pulley segment sets, as the endless member engages them, may be maintained.

Figure 2A:
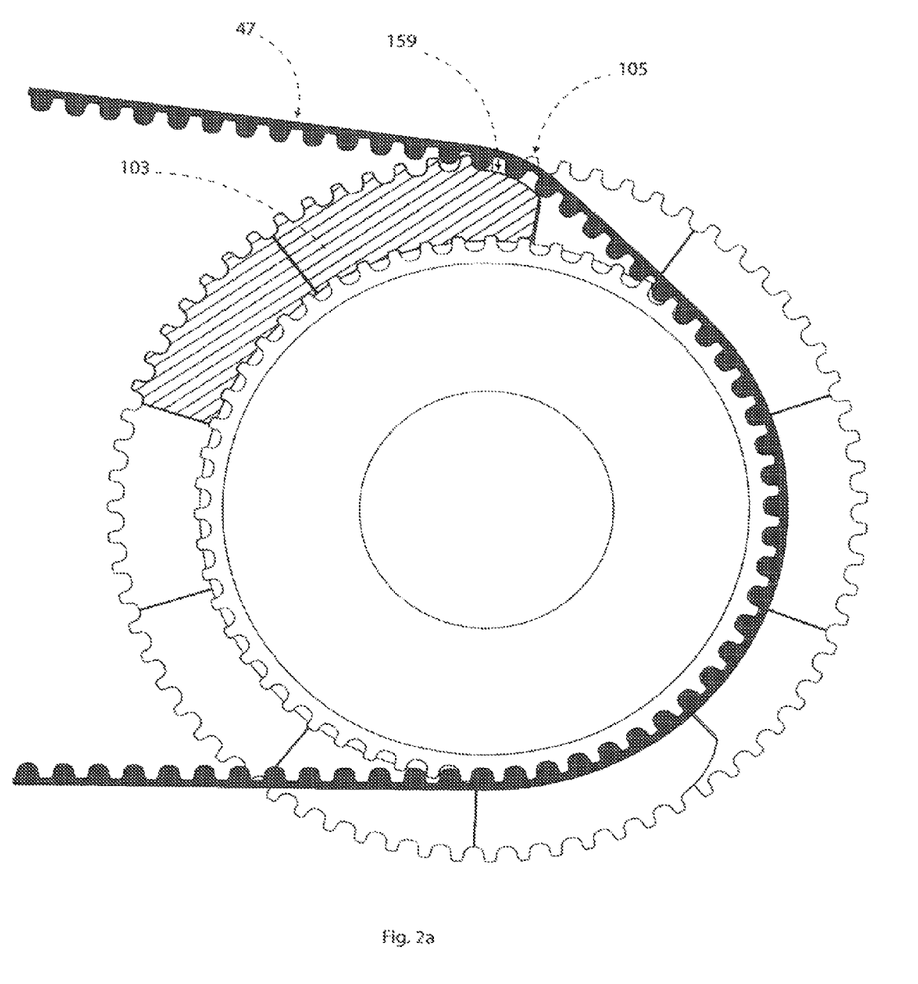
FIG. 2a shows a side view of a core pulley, a pulley segment set including key pulley segment and adjacent pulley segment, and a toothed endless member, where said endless member is simultaneously engaging the teeth of the core pulley and the teeth of the key pulley segment such that some of the teeth of the endless member are demonstrated to be on the supporting surface of the trimmed area of the key pulley segment, such that the bending radius of the endless member is increased.
Figure 2B:
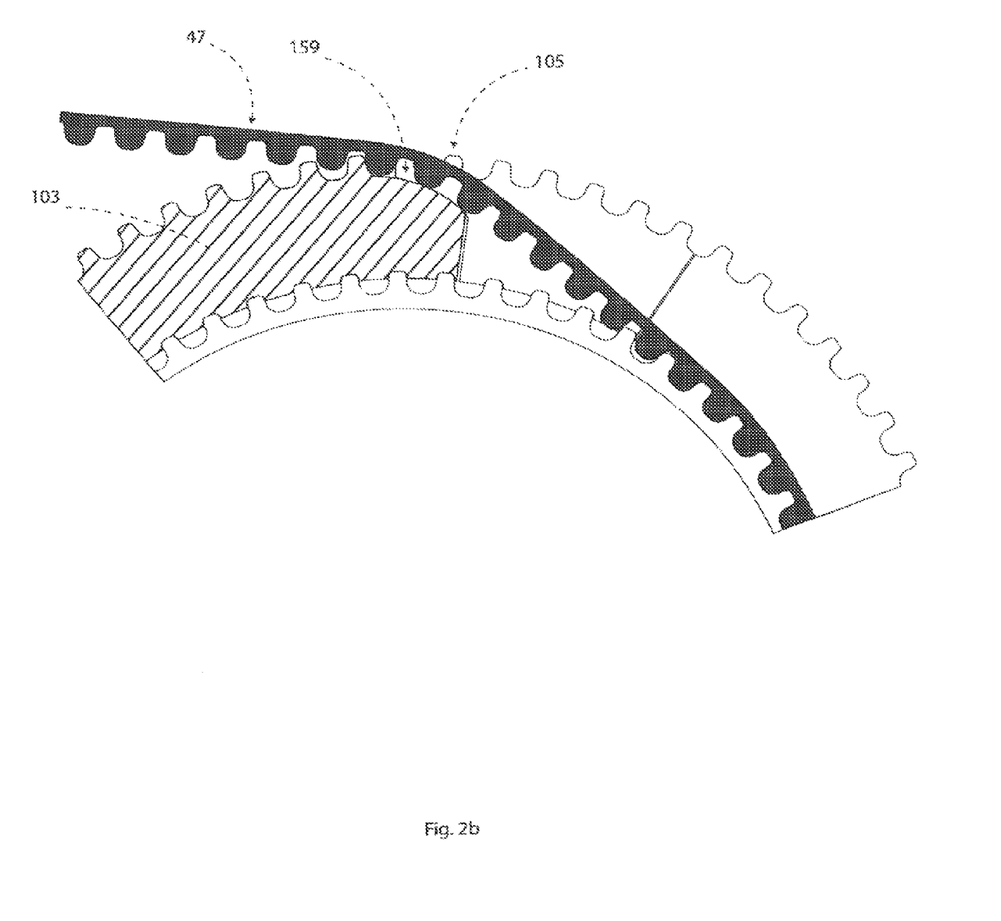
FIG. 2b shows a close view of the same core pulley, some pulley segments of the same pulley segment set (including the same key pulley segment and adjacent pulley segment), and the same endless member as in FIG. 2a, and showing the same transition and action.
Figure 2C:
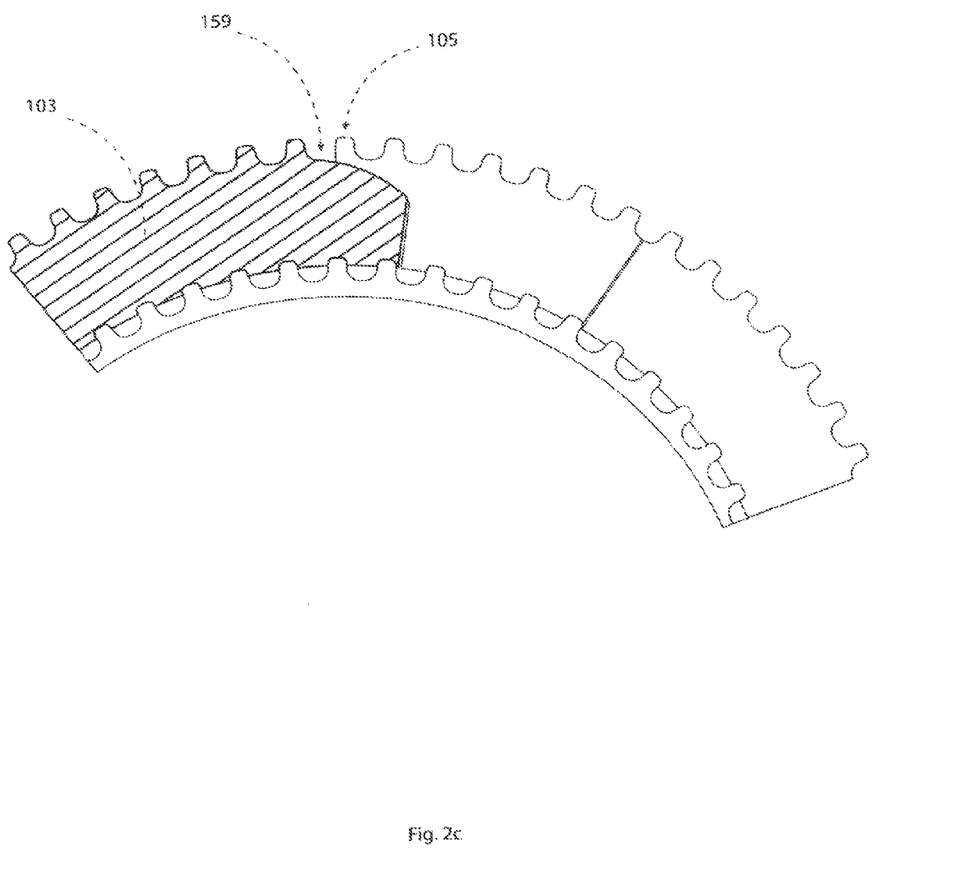
FIG. 2c shows a close view of part of the core pulley, a key pulley segment, an adjacent pulley segment, and a pulley segment without the endless member, allowing a view of the trimmed teeth and supporting surface of the key pulley segment, and the overhanging, extended area of the adjacent pulley segment.

In addition, completely trimmed teeth may be engineered to create a supporting surface for the endless member on the key pulley segment. Referring now to FIGS. 2a through 2c, the elongated adjacent pulley segment 105 is shown, and pulley segment teeth 104 are trimmed away, and in their place there is created a supporting surface 159 which prevents the endless member 47 from bending sharply. The supporting surface 159 is curved, having an arbitrary radius that is defined by someone skilled in the art.

The radius of the supporting surface may be altered to change the tension of the endless member teeth on the pulley segment teeth, or to remove unwanted interference or slack, without changing the circumferential relationship between the two pulley segment sets in transition (comprising the origin set and the destination set).

Another unique feature of the functioning of the key pulley segment is the elongated or overhanging teeth feature of the adjacent pulley segment. The pulley segment which is adjacent to the sprocket may have an extending portion which slidably mates with the supporting surface of the key pulley segment, thereby receiving radial support from the key pulley segment. The overhanging teeth of the adjacent pulley segment replace the "missing" teeth that have been shortened or completely trimmed on the key pulley segment as previously described, and in so doing complete the pulley segment set such that there are no missing teeth while all the segments of the pulley segment set are in the engaging position.

The geometric relationship of the overhanging segment teeth and supporting surface may optimize the functioning of the key pulley segment. The key pulley segment supporting surface and the overhanging teeth may have round, or partially cylindrical, surfaces where the endless member may be engaged. In order that the key pulley segment supporting surface and the overhanging teeth supporting surface do not become stuck or bound in the event of twisting or misalignment of the endless member, one or both supporting surfaces may have features which isolate the point of contact such that the surfaces will not bind together. Such features may be designed by someone skilled in the art, and may comprise an engineered bump, nub, or a rail, or multiples or combinations thereof, amongst other features.

Alternative Pulley Segment Stack Configuration and Implementation

A plurality of pulley segments in a pulley segment stack may be designed to move together. In this case, pulley segments from different pulley segment sets that are proximate to each other may be fused, bonded, connected or constructed into a stack that may be actuated as one object (a "unified stack"). FIGS. 3 to 7 show differing views of the configuration and operation of said unified stack.

Figure 3A:
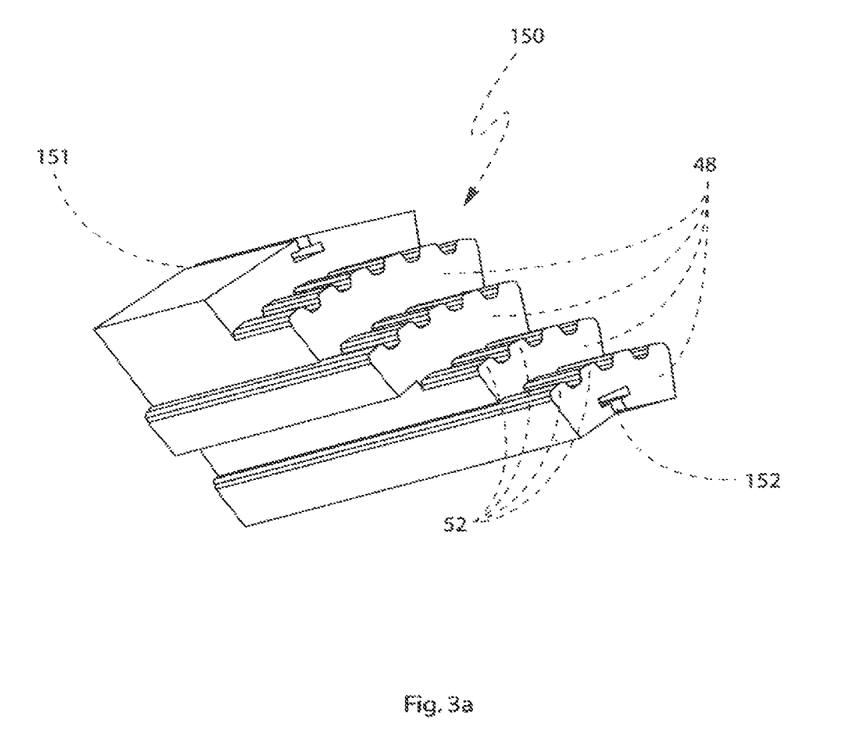
FIG. 3a shows a perspective side-front view of a unified pulley segment stack.
Figure 3B:
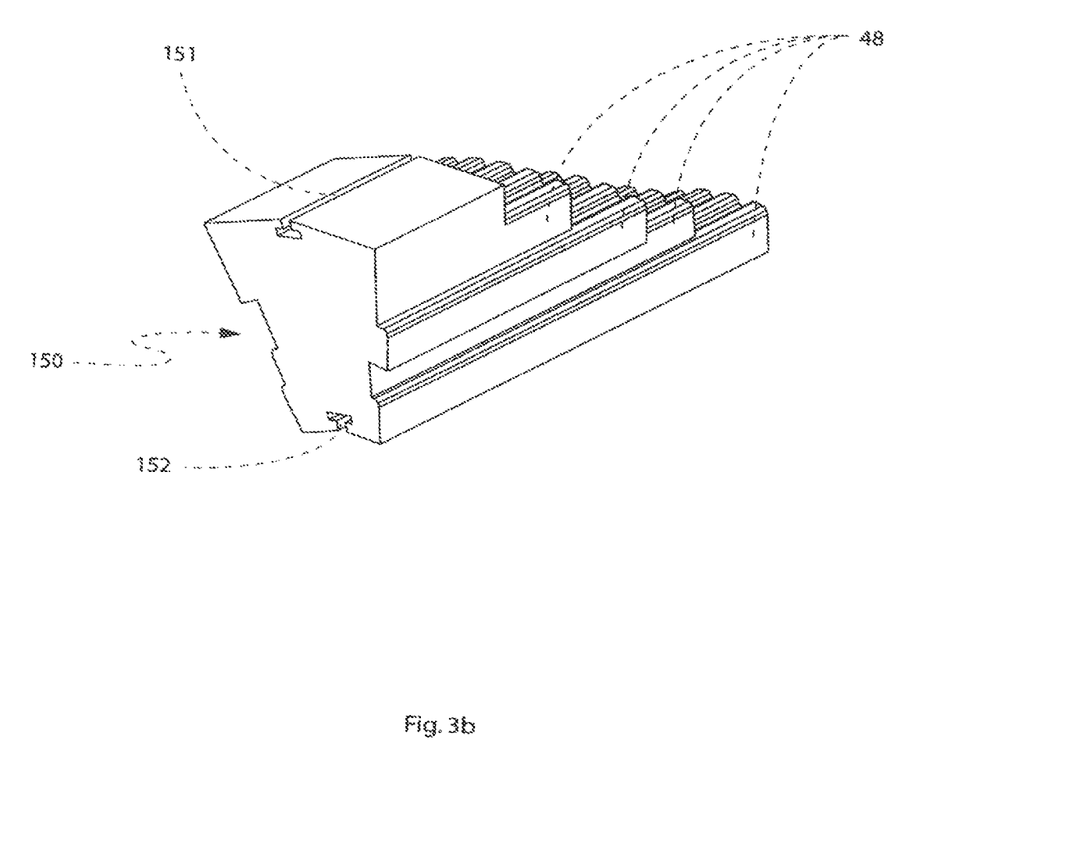
FIG. 3b shows a perspective side-rear view of a unified pulley segment stack.

Pulley segments in a unified stack may be staggered such that any one of said pulley segments may be in its engaging position when the unified stack is moved along the axis of rotation of the pulley assembly. FIGS. 3a and 3b provide two isometric views of a staggered pulley segment stack. Pulley segments 48 from different pulley segment sets that are vertically proximate are connected or constructed together into a unified stack 150. The pulley segment teeth 52 remain available to engage the teeth of the endless member when the unified stack 150 moves the desired pulley segment 48 into the engaging position. When a pulley segment is moved into its engaging position, the whole stack is moved, thus the pulley segment in the stack that was previously in the engaging position must be simultaneously moved out of the engaging position. In this embodiment, moving one unified stack such that one of its segments engages must necessarily mean moving another stack such that its previously engaging segment disengages.

A unified stack may feature a set of guiding rails on its "downward" or radially "inner" surface, on the surface closest to the axis of rotation of the pulley assembly, on the "downward" or radially "inner" side of the pulley segment of the smallest pulley segment set, facing the axis of rotation. A unified stack may also feature a set of guiding rails on its "upward" or radially "outer" surface, on the surface furthest from the axis of rotation, on the "upward" or radially "outer" side of the pulley segment of the largest pulley segment set, facing away from the axis of rotation.

The pulley assembly may have mating features that receive said inner guiding rails and may have another set of mating features that receive said outer guiding rails, holding the unified stack in relation to the pulley assembly, while permitting movement of the unified stack, on its sets of rails, parallel to the axis of rotation of the pulley assembly, thus allowing pulley segments in the unified stack to move into and out of their respective engaging positions. Said guiding rails and said mating features on the unified stacks of the pulley assembly may obviate the need for channels or rails on the lateral or side facets of the pulley segments, and the outer guiding rails on the outmost facing of the pulley assembly may obviate the need for, and function of, the core pulley, as in this embodiment the smallest pulley segment set becomes the "first gear". FIGS. 3a and 3b show outer mating features 151 and inner mating features 152. This embodiment may allow pulley segments to be robustly housed —congregated on one single side of the endless member in a single carousel, as opposed to the dual-carousel alignment in other embodiments.

Figure 4:
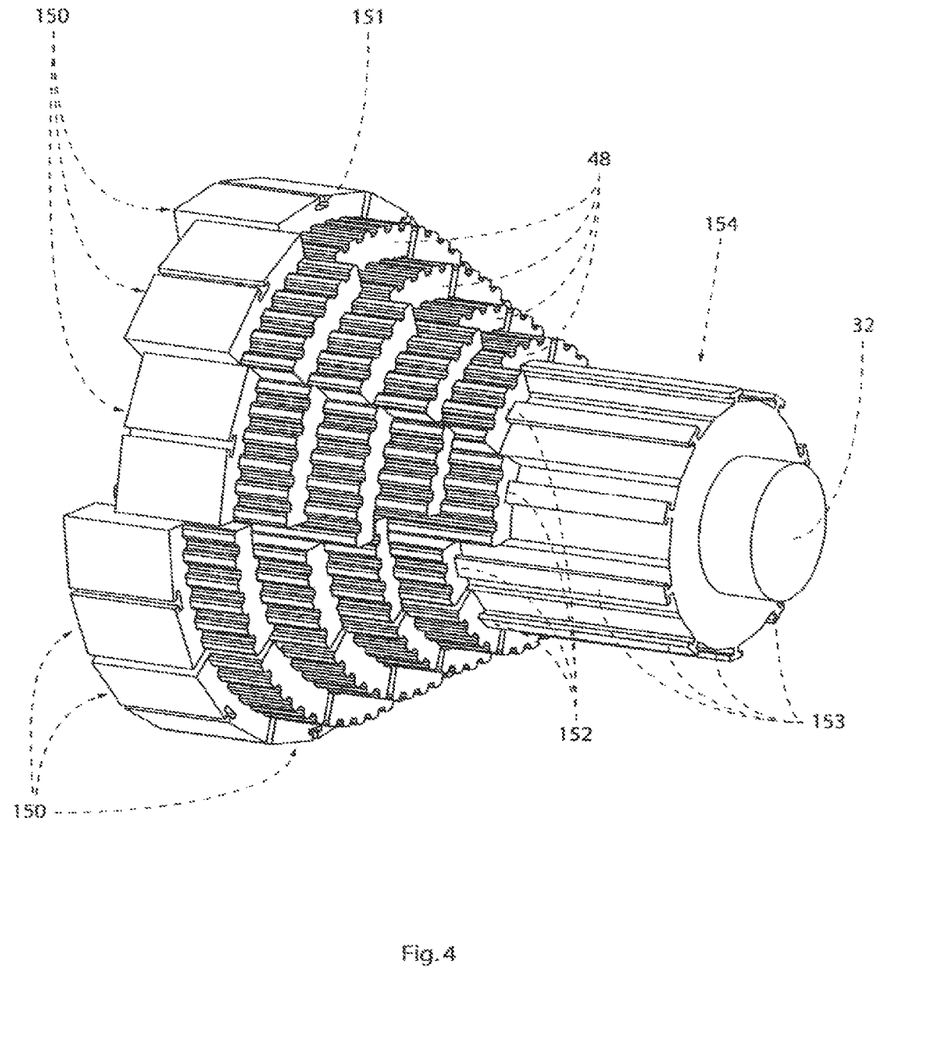
FIG. 4 shows a perspective side-front view of the pulley assembly, with the pulley segments staggered in unified pulley segment stacks, some of which unified pulley segment stacks are in transition between positions during a SSIPTS shift.

FIG. 4 shows an isometric view of the pulley assembly, as staggered unified pulley segment stacks are shifting. Pulley segments 48 are arranged into multiple staggered unified stacks 150, with outer mating features 151 and inner mating features 152, together with guiding rails 153 mounted on the core pulley 154, which is itself mounted on the axle 32 in the pulley assembly.

Figure 5:
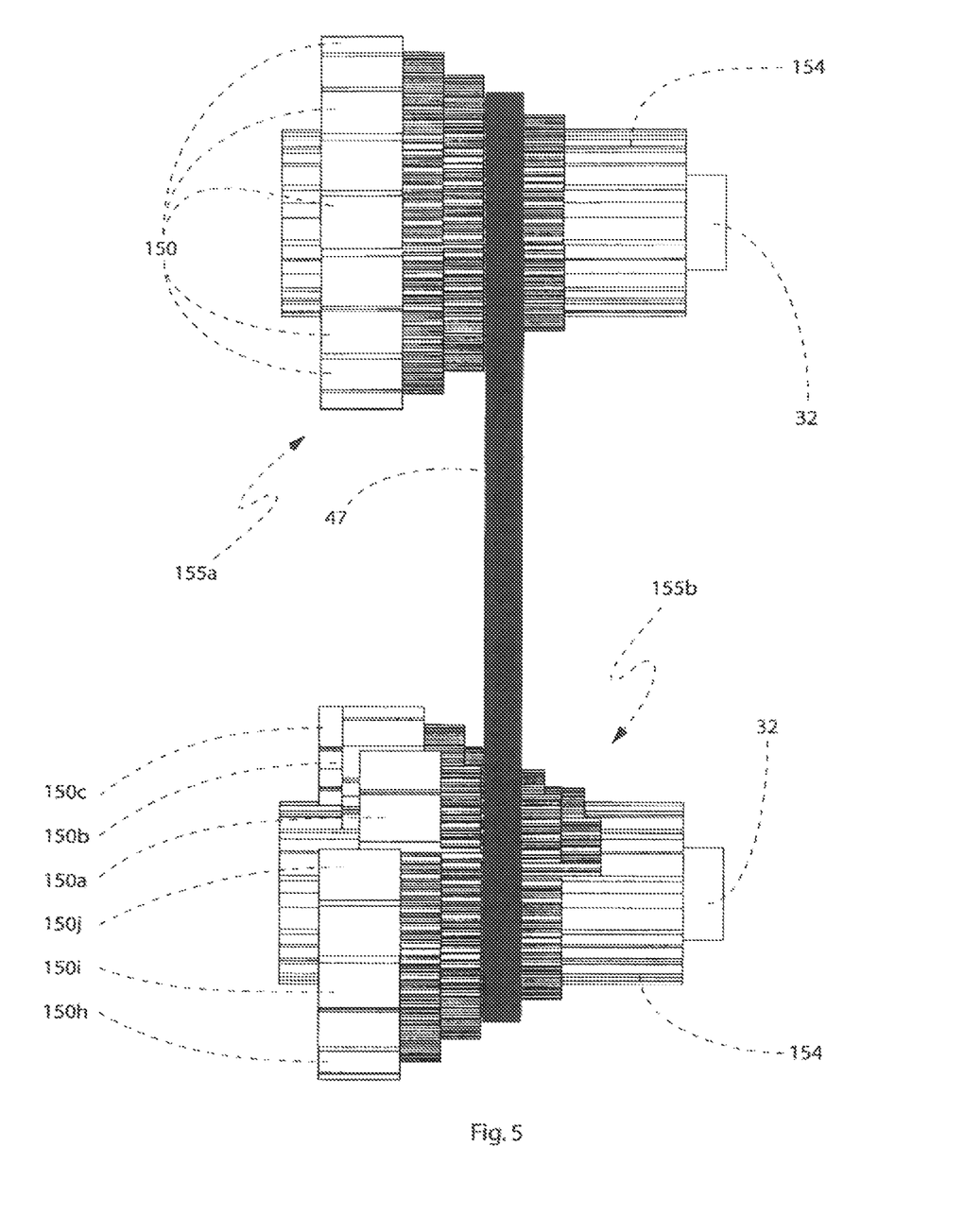
FIG. 5 shows a top view of the endless member engaging two SSIPTS systems as some of the unified pulley segment stacks in the lower SSIPTS are seen in transition between positions.

FIG. 5 shows a side view of the pulley assembly, as staggered unified pulley segment stacks are shifting. FIG. 5 portrays the driving pulley assembly 155b, and the driven pulley assembly 155a, each mounted on an axle 32. Unified staggered pulley segment stacks 150 may be further specified as individual unified stacks 150a through 150j (unified stacks 150d through 150g are obscured from view and not shown). The second-smallest pulley segment 48 in the unified stacks 150c, 150d, 150e, 150f, 150g, 150h, 150i and 150j are in the engaging position of the endless member 47, while the third-smallest pulley segment in unified stack 150a has just moved into the engaging position, and the $3^{rd}$ smallest pulley segment of unified stack 150b has been actuated and is moving into the engaging position. In this example, the third-smallest pulley segment of unified stack 150a is a key pulley segment, and thus engages the endless member 47 first of its set.

Figure 6:
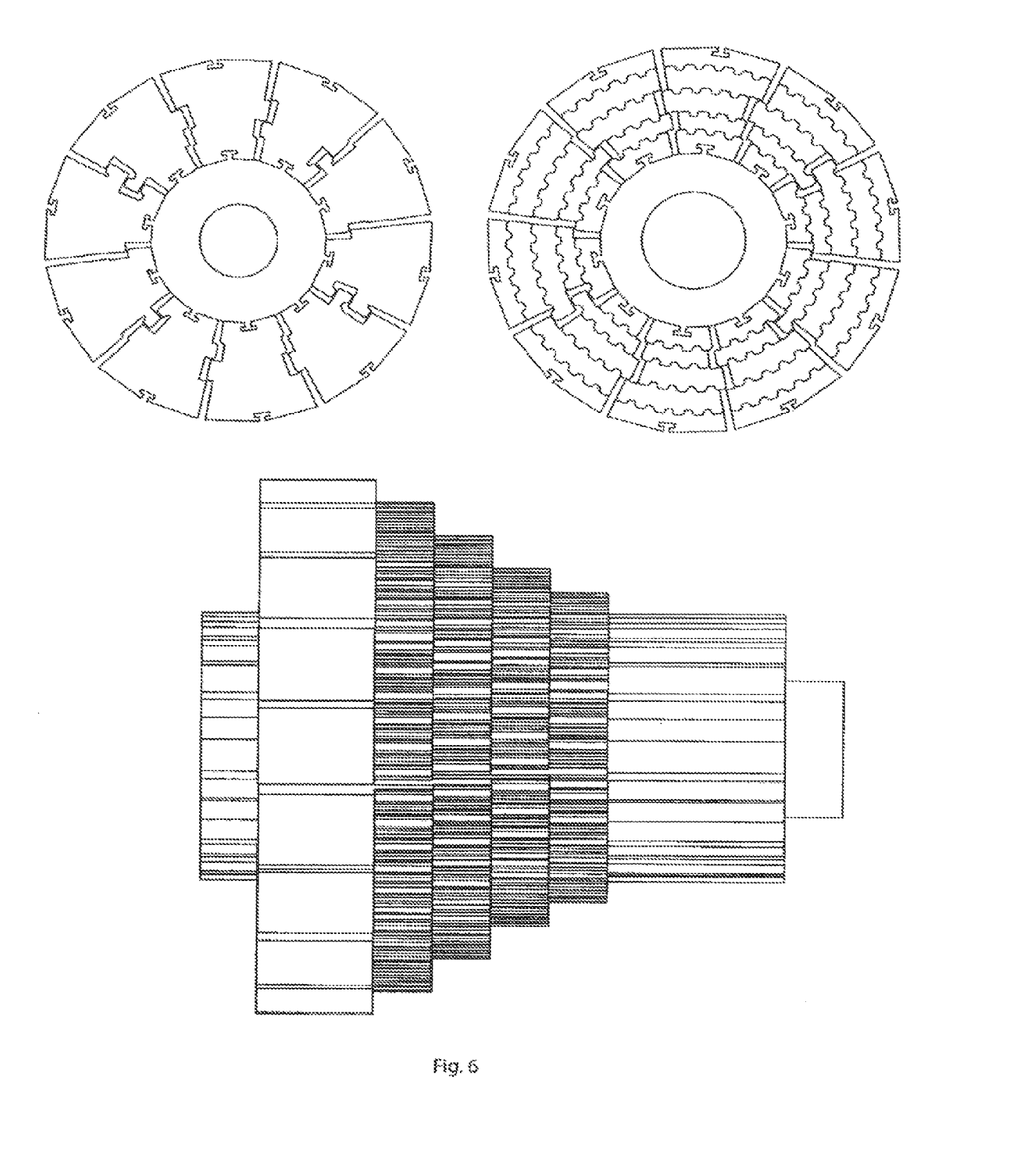
FIG. 6 shows three views of the pulley assembly, with unified pulley segment stacks currently aligned such that the endless member may engage one pulley segment set.

FIG. 6 shows three views of the pulley assembly, with staggered pulley segment stacks currently engaging in "second gear".

Key pulley segments may or may not all be in one unified stack, and any number of the pulley segments in a unified stack may be key pulley segments. A unified stack may contain no key pulley segments.

Figure 7:
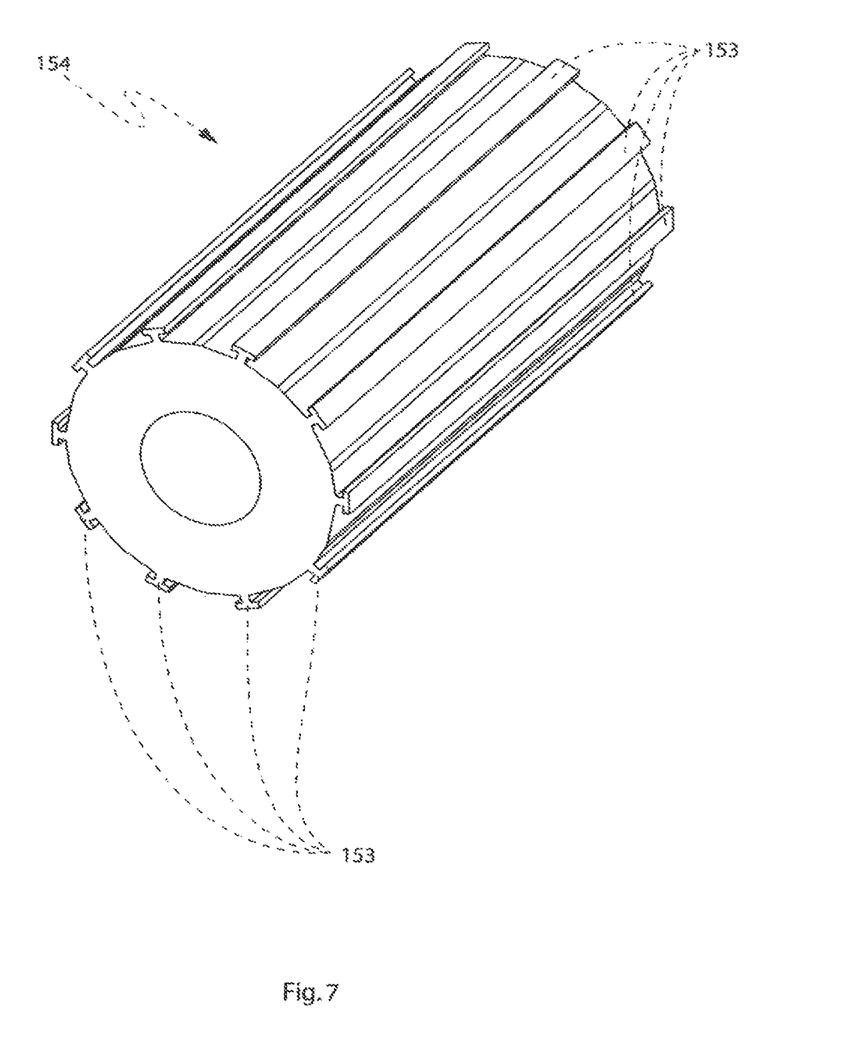
FIG. 7 shows guiding rails and mating features, as seen on the core pulley.

The core pulley may have teeth which may engage the teeth of the endless member, such that the teeth on the core pulley may also act as the rails of the core hub, which mate with the inner guiding rails of the proximate unified stack. FIG. 7 shows guiding rails 153 and mating features 153, as seen on the core pulley 154.

The SSIPTS system actuator, alone or in conjunction with the SSIPTS system sequencer, may utilize an indexing system, ratcheting system or other system to move a unified stack, axially, into and out of positions relative to the path of the endless member, in order that each pulley segment in said unified stack may move to its engaging position.

The pulley segments of a stack containing a pulley segment from each pulley segment set may be vertically separated into one or more unified stacks. For example, if eight individual pulley segments vertically grouped into one unified stack presents difficulty for the rail system or other systems, separation into two sub-stacks each comprising four vertically proximate segments may be desirable. In this example, in a SSIPTS employing eight pulley segment sets, the pulley segments emanating from the four smallest pulley segment sets may be constructed together into one unified stack, operated by one actuator mechanism, while the pulley segments emanating from the four largest pulley segment sets may be constructed together in a second unified stack, operated by a second actuator mechanism.

The main benefit of the embodiment utilizing a unified stack is the reduction in the number of actuators, although characteristics of strength, weight, size and operability may be evaluated by someone skilled in the art.

Design with Roller and Cam

Unified pulley segment stacks, composed of individual pulley segments, may be moved such that any pulley segment contained therein may be moved into or out of an engaging position, by way of a cam or roller cam system (the "stack axial motion"). In this configuration, each unified pulley segment stack has a roller which is slidably or rotatby attached to said stack, by way of a roller-arm or other supporting member. Said roller may also be a fixed member or other such cam follower which is lubricated or made of a material which is selected by someone skilled in the art for its strength, wear and friction characteristics, but is referred to hereafter as a "roller".

One or more cams are incorporated into the functioning of the SSIPTS, which cams are affixed or fixably mounted to the chassis or housing, and are located in the zone where the pulley segments may not be engaged by the endless member (the area outside the SSIPTS "contact zone", which may be called the "non-contact zone"). In the non-contact zone, a cam may engage the roller and, through engagement, move a unified pulley segment stack in a manner such that individual pulley segments of said stack may be moved into or out of an engaging position.

Cams may be mounted in an axial or linear array, or may feature one or more cams that are positionally interchangeable. One or more cams may be mounted in a movable manner, allowing it to accommodate several stack axial motions.

The roller may be moved, in relation to the stack, into and out of a position in which it may engage one of the cams (the "roller active position"). The roller may be mounted on a roller-arm or other movable supporting member, which guides the roller between the roller active position and its inactive position. Said supporting member shall be hereinafter referred to as the "roller-arm". The mass of the roller and roller-arm may be balanced with regard to the rotating or sliding axis such that centripetal forces will act upon the position of the roller positively, negatively, or neutrally, as deemed preferential by someone skilled in the art.

Figure 8:
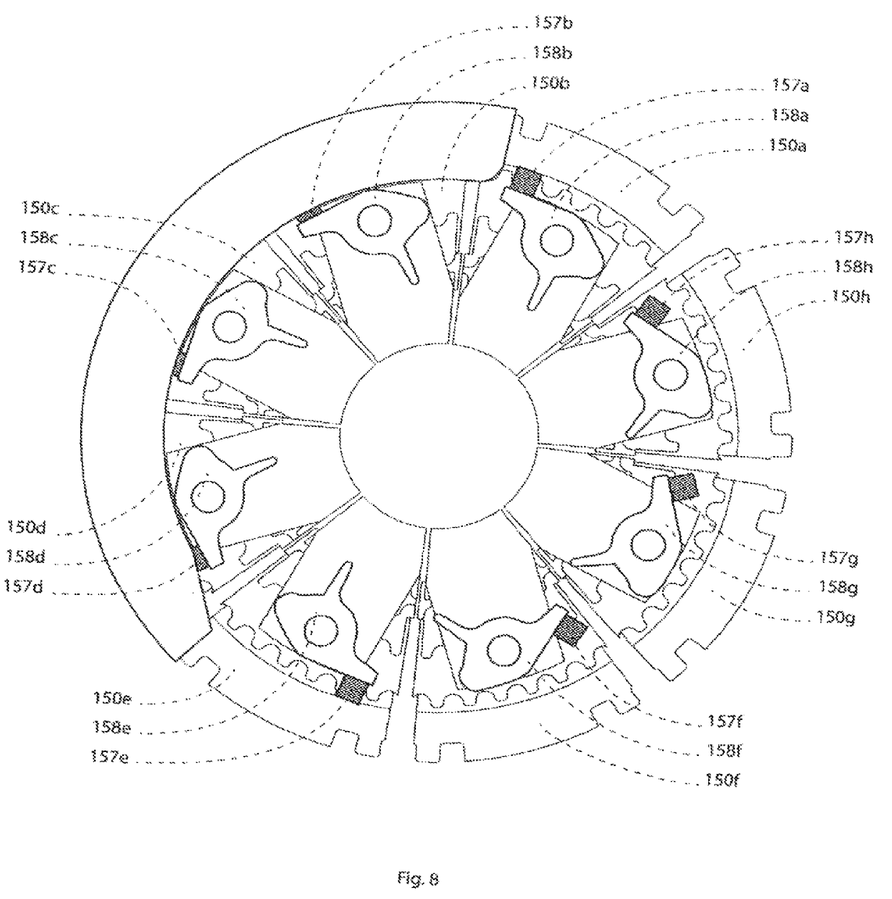
FIG. 8 shows a side view of cams where the cam channels are obscured, and rollers, trigger arms, trigger arm pivots, and electromagnet mounting on unified pulley segment stacks.

Referring now to FIG. 8, a series of unified pulley segment stacks 150 is seen with the cam 156, and with a series of rollers 157 and roller arms 158, where roller arms 158a, 158b, 158c, 158d, and 158e are in the roller active position, and roller arms 158f, 158g and 158h are in the roller inactive position.

While the pulley segments of a stack are in the SSIPTS "contact zone", the roller may be moved to the roller active position, such that the stack axial motion is commenced. The stack will then rotate into the "non-contact zone", the roller will engage the cam, and the cam will consequently move the roller and stack axially, such that one of the pulley segments of said stack will move from its engaging position to one of its non-engaging positions and, by the same motion, a second pulley segment in said stack will move from one of its non-engaging positions to its engaging position.

Cam Face Design

The surface of the cam which engages with the roller in the roller active position (the "cam engaging position") may be a curve which is optimized by someone skilled in the art to minimize the overall forces and stresses involved in the stack axial motion, and to improve stability and reliability of the motion and positioning of the unified pulley segment stacks. Each cam may have a specific curve, which is optimized for the overall pulley speed and other physical and operating characteristics which are particular to the pulley segments which are moved in the stack axial motion.

The cam may have a channel in which the roller travels, such that one face of said channel primarily pushes on the rolling face of the roller to move the stack toward its destination during the beginning of the action, and a second opposing face of said channel primarily pushes back, to slow and stop the roller as it reaches its destination. A third face of the cam may face inward toward the axle (being the inward surface or "bottom" of said channel), and may largely be coaxial with the axle, serving to keep said roller directly between said first and second faces of said channel. A portion of said third face, towards the end of the movement of the roller through the stack axial motion, may engage said roller to push against the outer face of said roller, thereby moving said roller toward the axis of rotation, or otherwise, in order to move said roller back to its —inactive position. A magnet, centripetal force, detent, or other mechanism may be used to keep said roller in its inactive position until otherwise actuated.

Actuation of the Roller

A roller and its roller-arm may be actuated by a mechanism which is electrically or mechanically controlled by the sequencer. The roller may be actuated mechanically by a solenoid, or by hydraulic, pneumatic, magnetic, or other such mechanical means. One method of actuation of a roller which is to be moved to its active position which does not require electric or mechanical power to be conducted to the rotating pulley assembly via the axle, may be the use of electromagnets. Electromagnets may be fixably mounted, in an array, to the housing near the path of said roller, such that they may actuate the desired roller into its active or non-active positions (an "electromagnet-array"). In such a case the roller, roller-arm, or a part or parts thereof, may have characteristics of ferromagnetism, magnetism, or inductive magnetism, as found in iron, a magnet, or a coil of wire, respectively, or characteristics of a combination thereof. An electromagnet-array may be composed of several electromagnets, each of which are individually controllable by the sequencer, arrayed in a circle near the path of a roller, in proximity to or as part of the cam, such that the roller may pass under each electromagnet, and each electromagnet may thereby exert force on the roller when desired.

Multiple Cam Engagement by the Roller

Figure 9:
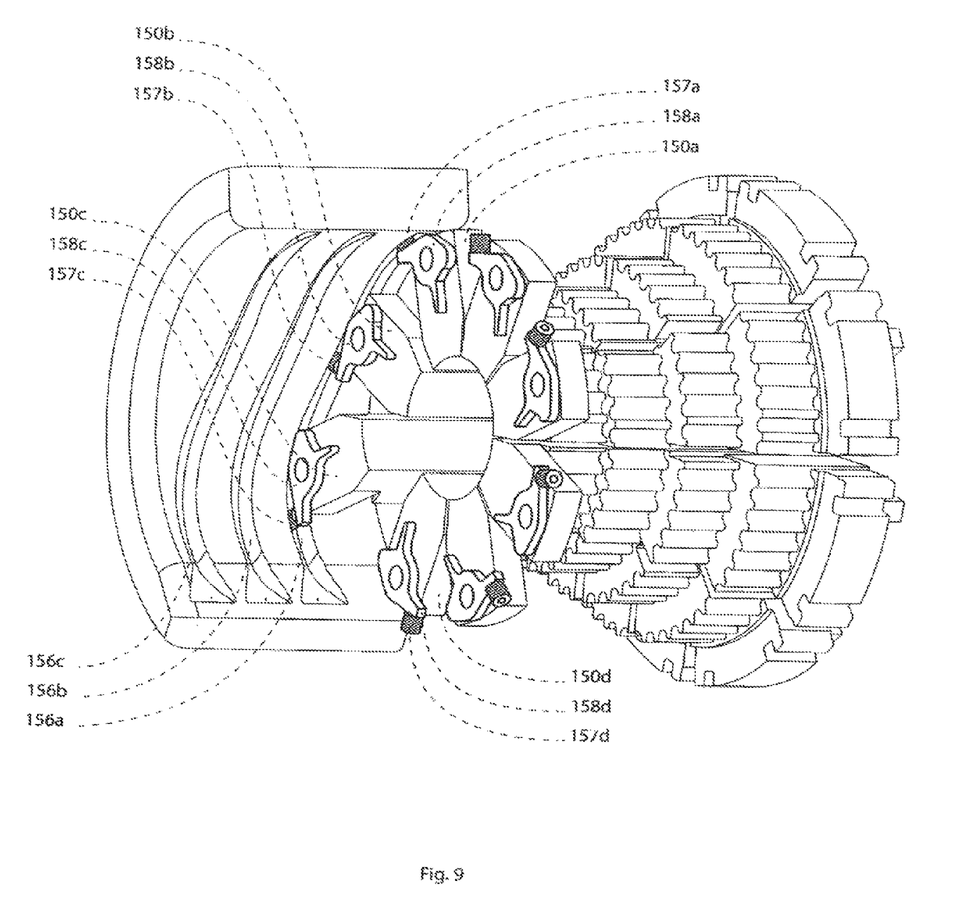
FIG. 9 shows a perspective view of unified pulley segments stacks arranged as they would be with a pulley assembly, with rollers, roller-arms, and cams.

A roller will be capable of discrete engagement with a plurality of cams (although a roller only engages with one cam at a time), in order to be available to complete several stack axial motions, which will enable the stack to move into a plurality of positions, which positions correspond to the several engaging positions of pulley segments contained in the stack. Referring now to FIG. 9, a series of unified pulley segment stacks 150 is seen with a series of cams 156, a series of rollers 157 and roller arms 158. Roller 157a (corresponding to the unified stack 150a) is in the roller active position, and said roller has almost completed its engagement with cam 156a. Roller 157b and roller 157c (with corresponding unified stacks 150b and 150c) are in the roller active position, and are seen engaging cam 156a. Roller 157d is seen in the roller active position, about to engage cam 156a. In this view, several rollers can be seen engaging cam 156a, which moves a unified stack 150 from its position where its second-smallest pulley segment may be in its engaging position, to the position where said unified stack's smallest pulley segment may be in its engaging position. In so doing, the SSIPTS accomplishes the transition from its second-smallest pulley segment set ("second gear") to the smallest pulley segment set ("first gear"). Once a roller 157 has completed its engagement with a cam 156—in the example shown, once roller 157a, for example, has completed its engagement with cam 156c—it may then be available to engage with another cam 156 (in the example shown, cam 156b, and so forth, until the end of the range of mounted cams). Said process may continue through multiple transitions, both from smaller pulley segment sets to larger pulley segment sets, and from larger pulley segment sets to smaller pulley segment sets, within the range of the mounted cams.

Several electromagnet-arrays may be implemented in order to facilitate a plurality of paths of said roller, so that said roller may engage a plurality of cams, where each of said paths of said roller corresponds to the path of each of the cam engaging positions.

Individual Selectable Pulley Segment Actuation by Fixably Mounted Actuator Components Each electromagnet in said electromagnet-array may be energized at a precise moment to commence the movement of a selected individual roller to its roller active position. The actuation may occur when said selected individual roller is proximate to said electromagnet, without significantly affecting the position of the preceding roller of an adjacent stack. Said roller and its stack may be so selected by the SSIPTS system sequencer because a key pulley segment in the currently engaging pulley segment set is located in said stack. As said roller passes under each electromagnet in said electromagnet-array, it may be the first roller affected by each electromagnet in said electromagnet-array. An electromagnet may remain energized thereafter, so that subsequent rollers passing proximate to said electromagnet will each also be so affected, and subsequently following stacks will follow the axial motion of the first stack, and therefore each pulley segment subsequent to the key pulley segment in the pulley segment set will be sequentially moved, like the key pulley segment, to or from its engaging position.

The best mode of the present invention is in a device requiring variable gearing between the driving member and the driven member. One application of the present invention is in vehicular transportation. In an automobile, the present invention would replace a common power transmission transmitting power between the engine and the wheels, allowing the engine to operate closer to its ideal operating speed for the given road speed. The present invention may also enhance the function of contemporary heating, ventilation, and air conditioning (HVAC) systems, and may confer substantial efficiency and other benefits.

Where a chosen tooth of a first pulley segment of a first pulley segment set, or a chosen tooth of a second pulley segment of said first pulley segment set, is shortened or otherwise modified in order to make said second pulley segment function property as a second key pulley segment, the transition of the endless member from said first pulley segment set to a second pulley segment set is enhanced, as the circumferential position of said first pulley segment may be already decided. Optionally, several pulley segments in a given pulley segment set may be designed to be key pulley segments as deemed fit by someone skilled in the art.

Lubrication of the pulley segments may allow said pulley segments to slide reliably between the engaging and non-engaging positions. Lubrication may be applied as a coating of a low-friction solid to the sliding faces of the pulley segments. The faces of the pulley assembly which mate with said faces of the pulley segments may also be applied with low-friction coatings of the same or different substance as those of the sliding faces of said pulley segments. Pressurized gas such as air may also be channeled through small holes on selected surfaces of the pulley assembly which mate with the sliding surfaces of pulley segments to create a bed of escaping gas to reduce friction. Lubrication may be applied primarily to the sliding faces of the pulley segments which face away from the axis of rotation, and the sliding faces of the pulley assembly and other faces of said pulley segment which may be proximate to said sliding faces of the pulley segment which face away from the axis of rotation to reduce friction caused by the centrifugal forces acted upon said pulley segment from the rotation around the axis of rotation of the pulley assembly.

Although the foregoing description relates to a specific preferred embodiment as presently contemplated by the inventors, it will be understood by those skilled in the art that the invention in its broad aspect includes mechanical and functional equivalents of the elements described herein.

It will be apparent that the scope of the present invention is limited only by the claims set out hereinbelow.

What is claimed is:

1. A pulley assembly comprising a plurality of toothed, concentric and coaxial pulleys for use as a key pulley segment, acting as one pulley segment in a pulley segment set, in a synchronized segmentally interchanging pulley transmission system, at least one of said pulleys of the pulley assembly comprising a pulley segment set comprising a plurality of pulley segments moveable into and out of the path of an endless member to change engagement of the endless member between pulleys of said pulley assembly, one of the pulley segments of the pulley segment set acting as a key pulley segment and having a distal relationship with the teeth of a second pulley of the pulley assembly such that simultaneous engagement of the endless member by the at least one pulley and the second pulley is possible, the key pulley segment incorporating one or more shortened or completely trimmed key pulley segment teeth, which teeth are either first or last in the pulley segment set of the at least one pulley to engage the endless member.

2. The pulley assembly of claim 1, wherein a plurality of pulleys of said pulley assembly comprises a pulley segment set comprising a plurality of pulley segments.

3. The pulley assembly of claim 1, wherein the teeth of the key pulley segment that are either the first or last in the pulley segment set to engage the endless member are completely trimmed to define a supporting surface.

4. The pulley assembly of claim 3 wherein the pulley segment of the pulley segment set that is adjacent to the supporting surface of the key pulley segment comprises an elongated or overhanging teeth feature to overlie the supporting surface.

5. The pulley assembly of claim 2, wherein the teeth of the key pulley segment that are either the first or last in the pulley segment set to engage the endless member are completely trimmed to define a supporting surface.

6. The pulley assembly of claim 5 wherein the pulley segment of the pulley segment set that is adjacent to the supporting surface of the key pulley segment comprises an elongated or overhanging teeth feature to overlie the supporting surface.

7. A synchronized segmentally interchanging pulley transmission system comprising the pulley assembly of claim 1.

* * * * *